United States Patent [19]
Vollmer et al.

[11] Patent Number: 6,064,689
[45] Date of Patent: May 16, 2000

[54] RADIO COMMUNICATIONS RECEIVER AND METHOD OF RECEIVING RADIO SIGNALS

[75] Inventors: Marius Vollmer, Dortmund; Martin Haardt, Munich; Juergen Goetze, Dortmund, all of Germany

[73] Assignee: Siemens Aktiengesellschaft, Munich, Germany

[21] Appl. No.: 09/326,184

[22] Filed: Jun. 4, 1999

[30] Foreign Application Priority Data

Jul. 8, 1998 [EP] European Pat. Off. .............. 98112673

[51] Int. Cl.$^7$ ...................................................... H04B 1/10
[52] U.S. Cl. ........................... 375/149; 375/150; 375/346; 375/348; 375/343; 375/335
[58] Field of Search ..................... 375/149, 150, 375/343, 346, 348; 370/335

[56] References Cited

U.S. PATENT DOCUMENTS

| | | | |
|---|---|---|---|
| 3,754,128 | 8/1973 | Corinthios | 235/156 |
| 5,349,691 | 9/1994 | Harrison et al. | 395/800 |
| 5,946,345 | 8/1999 | Karlsson et al. | 375/210 |

*Primary Examiner*—Amanda T. Le
*Assistant Examiner*—Dac V. Ha
*Attorney, Agent, or Firm*—Hill & Simpson

[57] ABSTRACT

A radio communications receiver which detects radio signals and recovers data representative of the radio signals in a presence of contemporaneously detected interfering signals, the radio communications receiver having a detector that detects said radio signals and generates digital base band signals representative of the radio signals, a matrix former that forms a correlation matrix having rows and columns from the base band signals, and a data processor that generates a factor matrix of the correlation matrix, the factor matrix having rows and columns, and recovers data from the factor matrix. The data processor generates the factor matrix by calculating first elements of the factor matrix from the correlation matrix using a factorization algorithm in accordance with a pre-determined structure of the factor matrix, and forming second elements of the factor matrix by selectively copying first elements in accordance with the pre-determined structure.

28 Claims, 3 Drawing Sheets

RADIO COMMUNICATIONS RECEIVER AND METHOD OF RECEIVING RADIO SIGNALS

BACKGROUND OF THE INVENTION

1. Field of the Invention

The present invention is directed to a radio communications receiver and more particularly to a radio communications receiver which detects radio signals and recovers data representative of the radio signals in the presence of interfering signals. The present invention is also directed to a method of receiving radio signals and recovering data representative of the radio signals in the presence of interfering signals.

2. Description of the Prior Art

In data and signal processing applications, it is often required to factorize a matrix of signal samples to provide a factor matrix having particular characteristics. For example, a desired factor matrix may be upper triangular or lower triangular in that the lower or upper part of the matrix may be filled with zeros. As a result, the factorized matrix may be interpreted as a set of simultaneous equations with these equations being solved in a manner facilitated by the upper or lower triangular form.

An example of where such matrix factorization is required is in radio communications receivers, and particularly in radio communications receivers which are arranged to detect radio signals and generate data from these radio signals in the presence of contemporaneously detected interfering signals. Such is the case with radio systems arranged to operate with code division multiple access. Code division multiple access is a radio communications technique in which data to be communicated is combined with a spreading code in some way before being modulated onto a radio frequency carrier signal. At the receiver, the radio signals are detected and the data is recovered by de-spreading the radio signals with knowledge of the spreading code used at the transmitter to form the radio signals. As a result of the spreading of the data, the receiver is able to generate a gain in the power of the detected signal, with respect to noise and other signals, for the wanted signal. As such, signals from a number of transmitters may be contemporaneously transmitted using different spreading codes and separated at corresponding receivers to the effect that the data which the radio signals represents may be recovered in spite of the presence of the interfering signals from the other transmitters. However, to detect the data from a wanted radio signal, the receiver must reject the unwanted signals which are contemporaneously detected with the wanted signal. As such, the receivers require extensive signal processing capabilities in order to detect the data in the presence of the unwanted signals. This represents a task of considerable complexity. As such, it may not be possible to detect the data in real time, because state of the art signal processors are not able to execute the number of calculations required for the signal processing algorithms before the data must be presented at an output. However, it is not always necessary to solve signal processing problems exactly. It is known to be possible to only compute an approximation of the exact solution without degrading the overall performance of the system. Computing an approximation of the solution reduces the amount of time spent solving the problem, reduces the amount of hardware required for implementing the algorithm, reduces the power consumption of the device, and in some case makes it possible to achieve real-time behavior in the first place.

A part of a process which is most appropriate for detecting data communicated in accordance with a code division multiple access system requires the factorization or decomposition of a correlation matrix. In order to effect real-time operation with known signal processors, it is necessary to provide an approximation to an exact solution of a factorization of this correlation matrix. In an article entitled "Real-time Feasibility of Joint Detection CDMA", by J. Mayer, J. Schlee and T. Weber, Proceedings of the Second European Personal Mobile Communications Conference, Bonn, Germany, September 1997, pages 245 to 252, an approximation of a matrix factorization is described using a known numerical approximation process. However, the computational effort needed to perform this multi-user detection is still considerable.

A technical problem therefore exists in further reducing the computational complexity, or correspondingly increasing the accuracy which can be achieved using an approximation method to generate factors of a matrix.

SUMMARY OF THE INVENTION

The technical problem is addressed generally by considering the generation of the matrix factor by analyzing the structure matrix factor and determining from the structure which of the elements of the matrix must be calculated exactly using a factorization algorithm, and which of the elements may be copied from the components calculated exactly.

According to the present invention, there is provided a radio communications receiver which detects radio signals and recovers data representative of the radio signals in the presence of interfering signals. The radio communications receiver comprises: a detector which detects the radio signals and generates digital baseband signals representative of the radio signals; a first processor which forms a correlation matrix from the baseband signals; and a data processor which generates a factor of the correlation matrix and recovers the data from the factor. The data processor generates the factor by calculating first elements of the factor from the correlation matrix using a factorization algorithm in accordance with a pre-determined structure of the factor matrix and forming second elements of the matrix by selectively copying said first elements from a first row of the matrix in accordance with the pre-determined structure.

The pre-determined structure of the factor matrix may be determined in accordance with a band structure from the form of the calculation and the technique used to represent the data as radio signals.

The first and second elements may be rows or columns of the matrix. The term rows as used herein may be substituted for the term columns in that by inverting either the correlation matrix or the factor matrix or both, the columns become rows and the rows become columns. The factor matrix may be an upper triangular matrix or a lower triangular matrix. Further, the radio signals and the interfering signals may be generated in accordance with code division multiple access. The code division multiple access may be time division-code division multiple access.

The known approximation methods for factoring a correlation matrix as disclosed in the above-mentioned reference entitled, "Real-time Feasibility of Joint Detection CDMA", by J. Mayer, J. Schlee and T. Weber, have been guided by a mathematical view of the calculation and the treatment has been restricted to one specific algorithm for computing this part, namely the Cholesky algorithm. The present invention, however results from an algorithmic analysis of the matrix factorization, from which a significant reduction in complexity is facilitated.

For the particular example of signal processing in a CDMA receiver, an approximation method greatly increases the capability of the receiver to cope with a technical problem known to those skilled in the art as the near/far problem, where different users are received with very different signal powers. As a result of the problem, contemporaneously received unwanted signals with comparatively high signal powers tend to prevent the detection of wanted radio signals having a comparatively low signal power. It is an object of this invention to address this problem.

This object is achieved in accordance with the present invention in a method of detecting a radio signal and recovering data representative of the radio signal in the presence of interfering signals. According to the method, radio signals are detected and digital base band signals representative of the radio signals are generated. A correlation matrix (S) is generated from the base band signals. A matrix factor (R) of the correlation matrix is generated. Then the data is recovered from the factor (R). The factor (R) is generated in accordance with the following operations: 1) first elements of the factor (R) are calculated from the correlation matrix (S) using a factorization algorithm, in accordance with a pre-determined structure of the factor (R), and 2) second elements of the matrix (R) are formed by selectively copying elements from the first rows in accordance with the pre-determined structure.

In a further embodiment of the present invention, there is provided a method of generating at least one factor (R) of a matrix (S) with the factor (R) being upper or lower triangular in form. According to the method, first elements of the factor (R) are calculated from the matrix (S) using a factorization algorithm, in accordance with a pre-determined structure, and second elements of the matrix (R) are formed by selectively copying elements from the first elements in accordance with the pre-determined structure.

DESCRIPTION OF THE PRESENTLY PREFERRED EMBODIMENTS

One embodiment of the present invention will now be described with reference to a mobile radio communications system which operates in accordance with code division multiple access. The present invention may operate with time division-code division multiple access (TD-CDMA) or wide band code division multiple access (W-CDMA). Both multiple access techniques will benefit from exploiting the opportunities of approximation. The TD-CDMA system is require to perform joint detection of all users that are active in one time/frequency slot. Compared to a TD-CDMA system, the number of simultaneously active users in a W-CDMA system is much higher. Therefore, it is currently not possible to jointly detect all users in a W-CDMA system. However, it is possible to perform multi-user detection, where only a subset of all users is included in the joint detection problem and the rest is treated as interference. Approximation methods increase the number of users that can be included in one detection step and can thus increase the resistance of the system to the near/far effect. This in turn leads to reduced demands on the power control.

Figure 1:
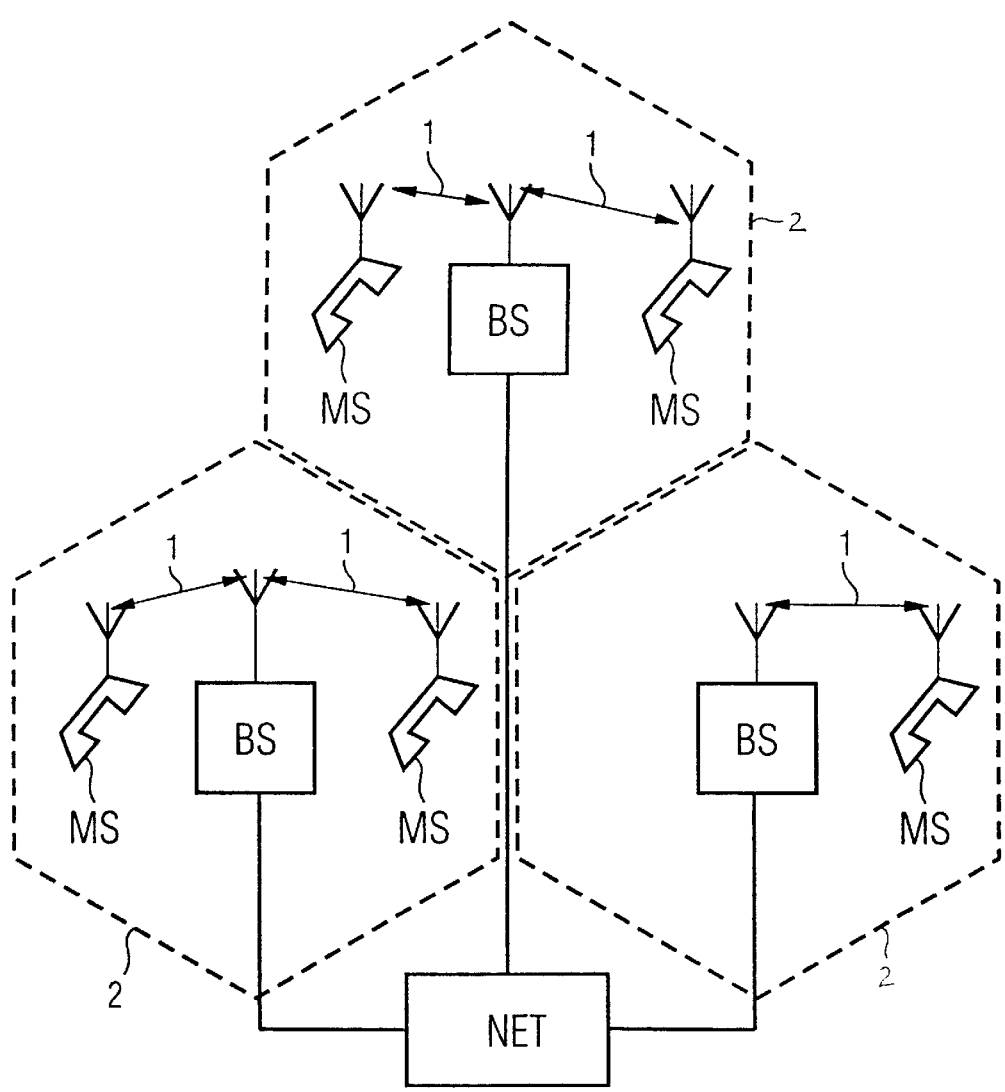
FIG. 1 is a schematic block diagram of a mobile radio telecommunications system constructed and operated in accordance with the invention.

The illustrative embodiment if the present invention will be described with reference to a TD-CDMA system. An example of part of a mobile radio telephone system which operates in accordance with a TD-CDMA system is illustrated in FIG. 1. In FIG. 1, three base stations BS are shown to be interconnected via a mobile network infra-structure, NET. Data is communicated between mobile stations MS and the base stations BS, by transmitting and receiving radio signals 1, between the base stations BS and the mobile stations MS operating within a radio coverage area effected by each of the base stations BS. The radio coverage area is shown illustrated as a broken line 2, and serves to indicate a boundary within which radio communications can be effected with the mobile stations MS. In the present illustrative embodiment, the mobile stations MS communicate with the base stations BS in accordance with a TD-CDMA system. A more detailed explanation of how data is communicated using a time division CDMA system is provided in an article, entitled "Performance of a Cellular Hybrid C-TDMA Mobile Radio System Applying Joint Detection and Coherent Receiver Antenna Diversity", by G. Blanz, A. Klein, M. Nasshan and A. Steil, published in the IEEE Journal on Selected Areas in Communications, Volume 12, No. 4, May 1994 at page 568, the content of which is incorporated herein by reference. However for the present explanation it should be noted that communication using TD-CDMA systems is characterized in that radio frequency carrier signals via which communication of data is effected are divided into a number of time-slots. Each of these time-slots is assigned to a number of mobile stations MS which operate to communicate radio signals in the time-slot. In order to separate data communicated by the number of mobile stations MS assigned to the same time-slot, each mobile station MS is provided with a user specific code which is convolved with the data to be communicated. A receiver 10 (FIG. 2) of the radio signals operates to separate data communicated by other mobile stations MS contemporaneously, in accordance with the user specific code. As will be appreciated, a similar arrangement is effected for data communicated from the base stations BS to the mobile stations MS.

Figure 2:
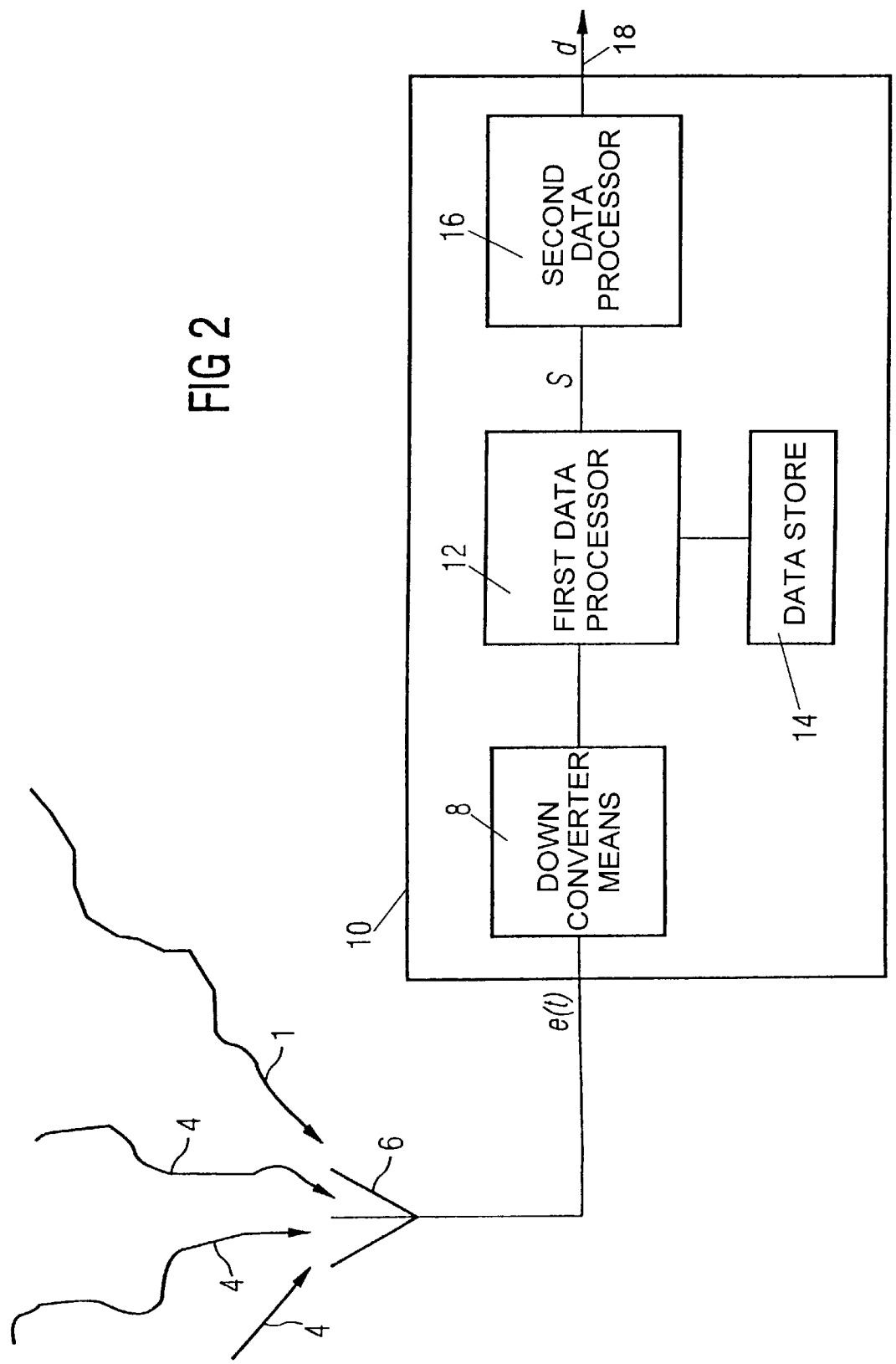
FIG. 2 is a schematic block diagram of a receiver which operates within the mobile radio communication system shown in FIG. 1.

A receiver 10 which operates within the mobile radio communications system shown in FIG. 1, is illustrated in FIG. 2. In FIG. 2, a wanted radio signal transmitted from a mobile station MS is represented by the line 1, whereas unwanted signals transmitted by other mobile stations are represented by the lines 4. The wanted and unwanted radio signals 1 and 4 are detected by an antenna 6 and fed to a radio frequency down converter means 8 of the receiver 10. The radio frequency down converter means 8 converts the received radio signals 1 and 4 into a base band representation which are thereafter analogue to digital converted and fed to a first data processor 12. The first data processor 12 generates a correlation matrix S, of the received radio signals in combination with a number of CDMA-spreading codes fed from a data store 14. The number of spreading codes held in a data store 14 correspond to each of the spreading codes used to spread the data modulated onto the wanted and unwanted radio signals 4 and 1. The data store 14 may also include a set of training sequences which are embedded in the unwanted and wanted signals 4 and 1 from which a channel impulse response of the communications channel through which the unwanted and wanted radio signals 4 and 1 have passed may be estimated. The correlation matrix S, is thereafter passed to a second data processor 16 which generates a factorized matrix R from the correlation matrix S from which data representative d of the wanted radio signals 1 is generated as an output on a conductor 18. Operation of the second data processor 16 will now be described in more detail.

The present example embodiment will be illustrated with regard to a receiver 10, which operates in accordance with TD-CDMA. As with W-CDMA, the problem can be reduced to solving a system of linear equations, after the correlation matrix S has been generated by the receiver 10. A received radio signal which has been generated in accordance with a TD-CDMA system can be modeled with an over-determined linear equation system, as illustrated in equation (1):

$$Ad = e \qquad (1)$$

The system matrix A contains the combined channel impulse responses and spreading codes of each of the signals contemporaneously received in each time slot. The vector e contains the received antenna samples and the vector d denotes the unknown data symbols. This system of equations is solved according to a least squares criterion. This may be effected, by factoring a correlation matrix, formed from the matrix A, by multiplying the matrix with a Hermitian transpose of itself. This is illustrated by equation (2):

$$A^H A d = A^H e \qquad (2)$$

The data is recovered from equation (2), by forming a factor matrix R, as determined by equation (3):

$$A^H A = R^H R \qquad (3)$$

In equation (3), R is upper triangular. From equation (2) and (3), equation (4) may be formed:

$$R^H R d = A^H e \qquad (4)$$

Equation (4) can be trivially solved by two substitution operations to recover the data vector d. To facilitate the following explanation, the correlation matrix to be factored is designed S, where $S = R^H R$.

A key step in this process of recovering the data vector d, is generating the factor matrix R. This can be generated exactly using an algorithm known to those skilled in the art as the Cholesky algorithm, a description of which may be found in a publication entitled "Coding, Modulation and Multiuser Decoding for DS-CDMA Systems", Ph.D. thesis by T. Ottosson, Chalmers University of Technology, Göteborg, Sweden, 1997. Having regard to the number of elements present in the matrix S, which is determined by the number of data symbols in the vector d, in combination with the length of the spreading sequence and the delay spread of the channel impulse response, the elements of the factor matrix R can not be calculated exactly using the Cholesky algorithm, as this would either prevent real-time operation, or require a data processor with a processing power not current available within the state of the art. However, the matrix S is known to have a structure which is Hermitian, positive definite and is also a block Toeplitz matrix with a band structure. As such, a known method for generating an approximation to the factor matrix R, is disclosed in the above referenced publication entitled "Realtime Feasibility of Joint Detection CDMA", by J. Mayer, J. Schlee and T. Weber. This approximation will now be described with reference to FIG. 3.

Figure 3:
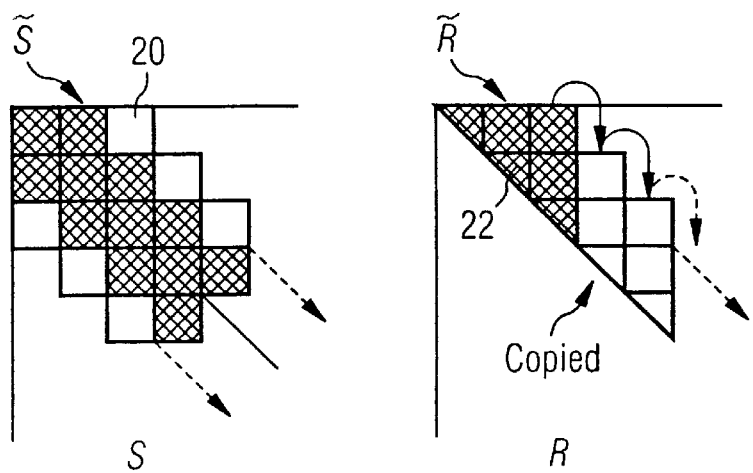
FIG. 3 is an illustrative representation of a known method of generating an approximation of a factor matrix R, from a correlation matrix S.

FIG. 3 is an illustrative representation of an approximation to the matrices S and R. For the correlation matrix S, and the matrix factor R, the following conventions are adopted:

$$S = (s_{ij}), \; S = A^H A$$

$R = (r_{ij})$, with R upper-triangular and $R^H R = S$, and for both S and R, $1 \leq i \leq n$, $1 \leq j \leq n$.

Let the blocks of S and R be of size k×k. Then the block-Toeplitz structure of S and the approximate block-Toeplitz structure of R can be described as expressed in equation (5):

$$s_{i,j} = s_{i-k, j-k} \text{ and } r_{i,j} = r_{i-k, j-k} \qquad (5)$$

Let $\tilde{S}$ be a square sub-matrix from the upper left corner of S, which is shown in FIG. 3, bounded by a dashed line 20. These elements of the matrix S, are bounded by an index $\tilde{n}$, as shown in FIG. 3, and described mathematically by equation (6):

$$\tilde{S} = (s_{ij}), \; 1 \leq i \leq \tilde{n} < n, 1 \leq j \leq \tilde{n} < n \qquad (6)$$

The Cholesky factor $\tilde{R}$ of $\tilde{S}$ is then a sub-matrix from the upper left corner of R bounded by a dashed line 22, as expressed by equation (7):

$$\tilde{R} = (r_{ij}), \; 1 \leq i \leq \tilde{n} < n, 1 \leq j \leq \tilde{n} < n \qquad (7)$$

The exact matrix R can thus be approximated by computing the Cholesky factor from a smaller sub-matrix $\tilde{S}$ of S and then filling the rest of R with copies of elements of $\tilde{R}$, as indicated by equation (5). As shown with the dashed line 20, 22, in FIG. 3, $\tilde{S}$ and $\tilde{R}$ are placed at the upper left corner of S and R, respectively. After computing $\tilde{R}$, shown as darker blocks on the right hand side of FIG. 3, the remaining blocks of R, which are shown in a lighter shade, are copied from corresponding columns of the sub-matrix $\tilde{R}$, in accordance with a pre-determined mathematical structure.

As described in the above referenced publication "Realtime Feasibility of Joint Detection CDMA", by J. Mayer, J. Schlee and T. Weber, the actual computation of $\tilde{R}$ can be done with the Cholesky algorithm, which requires one square-root operation and one division for each computed row of $\tilde{R}$. Let v be the degree of the block-band structure of R, that is, that there are only v k×k non-zero blocks directly on the diagonal and to the right of R in each block-row. To capture all the information of R, one needs to choose an $\tilde{R}$ that has at least a size of v×v blocks, as indicated in FIG. 3. This results in kv square root operations and kv divisions as required by the Cholesky algorithm.

This known technique for reducing a number of calculations required to generate the factor matrix R, is based on a mathematical assessment of the process for generating the matrix factor. However, the Applicant has observed that by further analyzing the structure of the factor matrix R, it is possible to achieve further reductions in the number of calculations required to produce the factor matrix R. In this way, the approximate block-Toeplitz structure of R is exploited, to the effect that only a small part of R is computed, and then the remaining parts are filled with suitable copies of the computed part. Exploiting this opportunity to reduce the number of calculations is an important part of being able to perform the joint-detection in real-time. The algorithms that can be used to compute $\tilde{R}$ can be written in a form so that the elements of $\tilde{R}$ are produced row-wise from top to bottom and within each row from left to right. While executing the algorithm, it is possible to leave out the computation of more of the elements $r_{ij}$, which are substituted with copies from those elements calculated exactly using the factoring algorithm, according to a pre-determined approximation for the structure of $\tilde{R}$. This approach leads to a close intertwining of the actual execution of the algorithm and the approximation process and thus results in great flexibility for controlling the approximation process.

This general principle can be applied to all algorithms that compute elements of a factor matrix R, using known factoring algorithms such as the Cholesky algorithm or other known algorithms such as the Block-Schur algorithm, which is known to those skilled in the art. Furthermore, it is beneficial for a wide range of signal processing tasks, like joint-detection in TD-CDMA systems and multi-user detection in W-CDMA systems.

The pre-determined structure, from which those elements of R which need to be calculated using the factoring algorithm, and those elements which may be copied, can be substantially arbitrary and can vary dynamically in accordance with, for example, the prevailing conditions for data communications using a CDMA radio communications system.

There are many forms which the pre-determined structure may take. By carefully choosing one, it is possible to only compute the most "important" elements. Copying an element according to equation (5) only really makes sense when the copied-from element exists. This means that at least the first k rows of R should be computed, because there are no elements from which they could be copied from. As a result of the pre-determined structure, which may, as in accordance with the present embodiment, identify a band-structure of the correlation matrix S, only the first vk elements of each of k rows are non-zero. In mathematical terms, this can be expressed as shown in equation (8):

$$\text{shall we compute } r_{ij}? = \text{is } i \leq k \text{ and } j \leq vk? \quad (8)$$

Figure 4:
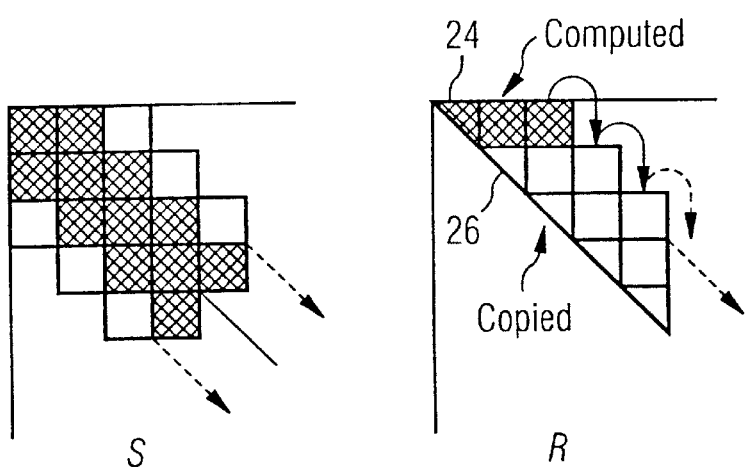
FIG. 4 is an illustrative representation of a method of generating a factor matrix R, from a correlation matrix S according to the present invention.

FIG. 4 provides an illustration of how the pre-determined structure of R is used to determine which elements can be copied and which must be calculated using the factoring algorithm. As illustrated, the darker shaded blocks 24 of R, on the right hand side of FIG. 4, are computed and the lighter blocks 26, are copied from them. Starting from this rule, the region of the computed elements can easily be enlarged. This generalization has been achieved by examining the process of computing the Cholesky factor from an algorithmic point of view. The state of the art teaches the skilled person only a mathematical, high level analysis of the calculation of the matrix factor R. This mathematical view only provided knowledge of matrix-level computations. Analyzing an implementation of the calculation, provides an insight into the structure of the factor matrix, from which a reduction in the number of computations can be effected. As will be clear to those skilled in the art, the illustrative embodiment of the present invention which finds an approximation to the generation of a Cholesky factor R, is one example of a general approach in which analysis of the structure of the factor matrix reveals a way in which a reduction in a number of computations can be achieved in calculating an approximation to a matrix factor.

Simulations have shown that exploiting these new opportunities for saving computational effort leads to an improvement over the existing solutions. These simulations have been carried out with a TD-CDMA model and have shown that the approximation to R according to the embodiment of the present invention, produces no reduction in the bit error rate of the recovered data, with a reduced amount of calculations. Only the first v blocks of the first block-row need to be computed, the rest of R can be copied from them. Compared to the known method of computing R, the embodiment reduces the amount of square root operations and divisions from vk to k. For typical channel models, this represents a reduction in the amount of calculations by around one third.

Figure 5:
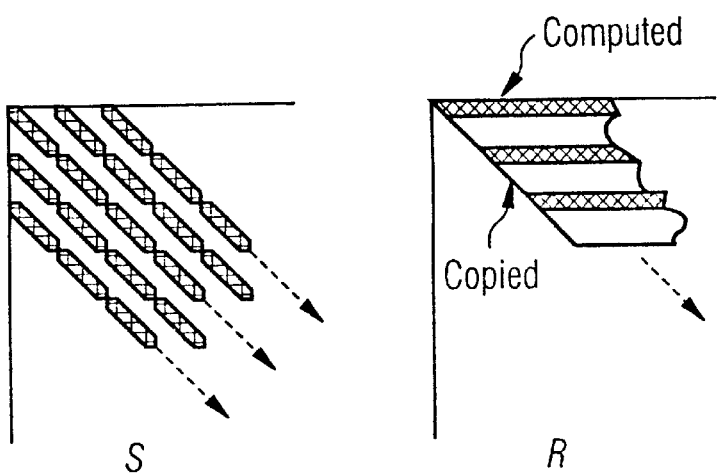
FIG. 5 is a further illustration of a method of generating a factor matrix R from a correlation matrix S according to the present invention.

The new approach is applicable to a wide range of algorithms, such as the original Cholesky algorithm or the improved Block-Schur algorithm. It can be used in many signal processing tasks that require a matrix decomposition to reduce time and space complexity. For example, it can be used in the joint-detection process in a TD-CDMA system and for multi-user detection in W-CDMA systems. It not only provides a finer control over the amount and specific placement of elements which are calculated exactly, it also provides a means for interleaving computation and approximation. This enables the matrix factor calculation to be performed by doing a little computation, then a little bit of copying and then resuming the computation. This facilitates use of the general approximation approach for matrices with a different kind of structure. For example, when considering the problem of incorporating decision feedback into the joint detection process, the matrix S has a Toeplitz-block structure instead of block-Toeplitz structure. It is then beneficial to periodically alternate between computing and copying. There is no easy way to express this with matrix notation alone. FIG. 5 provides an illustration of a different form of a Toeplitz-block structure with internal band structure and the layout of the elements of R according to whether they should be computed (dark) or copied (light).

As a further illustration of the example embodiment of the invention, a particular example of a calculation of a matrix factor R is provided in the following paragraphs, in comparison to a calculation using the Cholesky factoring algorithm.

The Cholesky algorithm for computing R can be expressed as follows:

for i in 1 to n
    for j in i to n
        compute $r_{ij}$
compute $r_{ij}$
    $x = s_{ij}$
    for k in 1 to i−1
        $x = x − r^*_{ki} r_{kj}$
    if j=i
        $r_{ii} = \sqrt{x}$
    else
        $r_{ij} = x/r_{ii}$ Note that the division in the case where i≠j can be replaced by a multiplication by pre-computing $1/r_{ii}$ once per row. The interleaving of actual computations and copy operations can then be achieved like this:

for i in 1 to n

```
for j in i to n
    if we should compute r_ij
        compute r_ij
    else
        copy r_ij
copy r_ij
    if i>k and j>k
        r_ij=r_{i-k,j-k}
    else
        r_ij=0
```

A numerical example of a correlation matrix S is provided as follows:

$$S = \begin{bmatrix} 4 & 2 & 0 \\ 2 & 4 & 2 \\ 0 & 2 & 4 \end{bmatrix}$$

In this example k=1, that is, the matrix S is not really block-Toeplitz, but rather, it has an ordinary Toeplitz structure. The matrix S has a band structure with v=2. The exact Cholesky factor R, to four decimal places is:

$$R = \begin{bmatrix} 2.0000 & 1.0000 & 0.0000 \\ 0.0000 & 1.7321 & 1.1547 \\ 0.0000 & 0.0000 & 1.6330 \end{bmatrix}$$

As can be seen, R also has band-structure with v=2 and the elements down the diagonals can be considered to be approximately equal. This approximate equality is much more pronounced for larger matrices. Equation (8) provides for the case that only elements $r_{11}$ and $r_{12}$ should be computed, and the rest is copied. The approximating algorithm now starts by computing $r_{11}$ and then $r_{12}$. The element $r_{13}$ should be "copied" and is set to zero because the element that would be approximately equal to it, $r_{-12}$, does not exist. This is correct because $r_{13}$ is known to be zero due to the band structure of R. The algorithm then proceeds to copy elements $r_{22}$, $r_{23}$ and $r_{33}$ from their respective approximations $r_{11}$, $r_{12}$ and $r_{22}$. Thus, R according to equation (8) is:

$$R^{(8)} = \begin{bmatrix} 2.0000 & 1.0000 & 0.0000 \\ 0.0000 & 2.0000 & 1.0000 \\ 0.0000 & 0.0000 & 2.0000 \end{bmatrix}$$

The calculation of $R^{(8)}$ requires one square root operation and one division. Using the known approximation technique, we would have also had to calculate element $r_{22}$:

$$R^{(5)} = \begin{bmatrix} 2.0000 & 1.0000 & 0.0000 \\ 0.0000 & 1.7321 & 1.0000 \\ 0.0000 & 0.0000 & 1.7321 \end{bmatrix}$$

requiring two square root operations and two divisions.

Clearly, this is a better approximation than $R^{(8)}$. But considering that computing the rest of the second row does not involve the costly square root operation and division, it would be advantageous to also compute $r_{23}$ (but not $r_{33}$). The matrix oriented approach known to those skilled in the art can not express this. The rule for this would be:

$$\text{shall we compute } r_{ij}? = \text{is } i \leq kl \text{ and } j \leq (v+l-1)k? \quad (9)$$

This rule computes all non-zero elements of the first kl rows. For our example, with l=2 the factor matrix becomes:

$$R^{(9)} = \begin{bmatrix} 2.0000 & 1.0000 & 0.0000 \\ 0.0000 & 1.7321 & 1.1547 \\ 0.0000 & 0.0000 & 1.7321 \end{bmatrix}$$

with only two square roots and two divisions. This is a better approximation than $R^{(5)}$, with the same amount of square roots and divisions.

As will be appreciated by those skilled in the art various modifications may be made to the illustrative embodiment without departing from the scope of the present invention. In particular, multi-user detection in a W-CDMA system can also be effected. In this case, data detection from wanted radio signals in the presence of unwanted radio signals is expressed according to equation (10):

$$b_{dec} = dec(R_w^{-1} y) \quad (10)$$

In equation (10), where $R_w$ is the cross-correlation matrix of the system (not a Cholesky factor), and dec() is a function which determines a part of the complex plane within which the signals fall. The cross-correlation matrix $R_w$, is a Hermitian, positive semi-definite, block-Toeplitz, band matrix. Solving equation (10) efficiently amounts again to computing the Cholesky factor of $R_w$. As a result of the special structure of $R_w$, as with the correlation matrix $A^H A$, the desired Cholesky factor R has the same band structure and is approximately block-Toeplitz.

Although modifications and changes may be suggested by those of ordinary skill in the art, it is the intention of the inventor to embody within the patent warranted hereon all changes and modifications as reasonably and properly come within the scope of his contribution to the art.

We claim as our invention:

1. A radio communications receiver which detects radio signals and recovers data representative of said radio signals in a presence of contemporaneously detected interfering signals, said radio communications receiver comprising:

a detector that detects said radio signals and generates digital base band signals representative of said radio signals;

a matrix former that forms a correlation matrix having rows and columns from said base band signals; and a data processor that generates a factor matrix of said correlation matrix, said factor matrix having rows and columns, and recovers said data from said factor matrix, wherein said data processor generates said factor matrix by calculating first elements of said factor matrix from said correlation matrix using a factorization algorithm in accordance with a pre-determined structure of said factor matrix, and by forming second elements of said factor matrix by selectively copying first elements in accordance with said pre-determined structure.

2. The radio communications receiver as claimed in claim 1, wherein said pre-determined structure of said factor matrix is determined in accordance with a band structure of said factor matrix.

3. The radio communications receiver as claimed in claim 1, wherein said first elements are contained in at least one row of said factor matrix and said second elements are contained in at least one row of said factor matrix.

4. The radio communications receiver as claimed in claim 1, wherein said first elements and said second elements are present in a same row of said factor matrix.

5. The radio communications receiver as claimed in claim 4, wherein said data processor generates said factor matrix by, for each row of said factor matrix and from said predetermined structure, calculating elements of a row of said factor matrix using said factorization algorithm and corresponding elements from said factorization matrix when said elements of said row of said factor matrix should be calculated using said factorization algorithm, and copying said elements of said row of said factor matrix from said first elements when said elements of said row of said factor matrix are second elements and can be copied from said first elements.

6. The radio communications receiver as claimed in claim 1, wherein said rows are said columns of said factor matrix and said columns are said rows of said factor matrix.

7. The radio communications receiver as claimed in claim 1, wherein said factor matrix is upper triangular.

8. The radio communications receiver as claimed in claim 1, wherein said factor matrix is lower triangular.

9. The radio communications receiver as claimed in claim 1, wherein said radio signals and said interfering signals are generated in accordance with a code division multiple access scheme.

10. The radio communications receiver as claimed in claim 1, wherein said factorization algorithm is a Cholesky algorithm.

11. The method as claimed in claim 10, wherein said factor matrix is upper triangular.

12. The method as claimed in claim 10, wherein said factor matrix is lower triangular.

13. The method as claimed in claim 10, wherein said radio signals and said interfering signals are generated in accordance with a code division multiple access scheme.

14. The method as claimed in claim 10, wherein said factorization algorithm is a Cholesky algorithm.

15. The method as claimed in claim 10, wherein said factorization algorithm is a Block-Schur algorithm.

16. The method as claimed in claim 15, further including the steps of:

calculating, for each row of said factor matrix and from said predetermined structure, elements of a row of said factor matrix using said factorization algorithm and corresponding elements from said factorization matrix when said elements of said row of said factor matrix should be calculated using said factorization algorithm; and copying, for each row of said factor matrix and from said predetermined structure, said elements of said row of said factor matrix from said first elements when said elements of said row of said factor matrix are second elements and can be copied from said first elements.

17. A method of detecting a radio signal and recovering data representative of said radio signal in a presence of interfering signals, said method comprising the steps of:

detecting said radio signals and generating digital base band signals representative of said radio signals;

generating a matrix factor of said correlation matrix; and recovering said data from said factor matrix, wherein said factor matrix is generated in accordance with the following steps:

calculating first elements of said factor matrix from said correlation matrix using a factorization algorithm in accordance with a predetermined structure of said factor matrix; and forming second elements of said factor matrix by selectively copying elements from said first elements in accordance with said predetermined structure.

18. The method as claimed in claim 17, wherein said predetermined structure of said factor matrix is determined in accordance with a band structure of said factor matrix.

19. The method as claimed in claim 17, wherein said first elements are contained in at least one first row of said factor matrix and said second elements are contained in at least one second row of said factor matrix.

20. The method as claimed in claim 17, wherein said first elements and said second elements are present in a same row.

21. The method as claimed in claim 20, wherein said factor matrix is generated in accordance with the following steps:

calculating, for each row of said factor matrix and from said predetermined structure, elements of a row of said factor matrix using said factorization algorithm and corresponding elements from said factorization matrix when said elements of said row of said factor matrix should be calculated using said factorization algorithm; and copying, for each row of said factor matrix and from said predetermined structure, said elements of said row of said factor matrix from said first elements when said elements of said row of said factor matrix are second elements and can be copied from said first elements.

22. The method as claimed in claim 17, wherein said rows are said columns of said factor matrix and said columns are said rows of said factor matrix.

23. A method of generating at least one factor matrix of a correlation matrix, said factor matrix being selected from the group consisting of upper and lower triangular formed matrices, said method comprising the steps of:

calculating first elements of said factor matrix from said correlation matrix using a factorization algorithm in accordance with a predetermined structure; and forming second elements of said factor matrix by selectively copying elements from said first elements in accordance with said predetermined structure.

24. The method as claimed in claim 23, wherein said first elements are contained in at least one first row of said factor matrix and said second elements are contained in at least one second row of said factor matrix.

25. The method as claimed in claim 24, wherein said predetermined structure of said factor matrix identifies said at least one first row of said factor matrix to be calculated in accordance with said factorization algorithm and said second elements of said factor matrix in accordance with a band structure.

26. The method as claimed in claim 23, wherein said rows are columns of said factor matrix and said columns are said rows of said factor matrix.

27. The method as claimed in claim 23, wherein said radio signals and said interfering signals are generated in accordance with a code division multiple access scheme.

28. The radio communications receiver as claimed in claim 1, wherein said factorization algorithm is a Block-Schur algorithm.

* * * * *